UNITED STATES PATENT OFFICE.

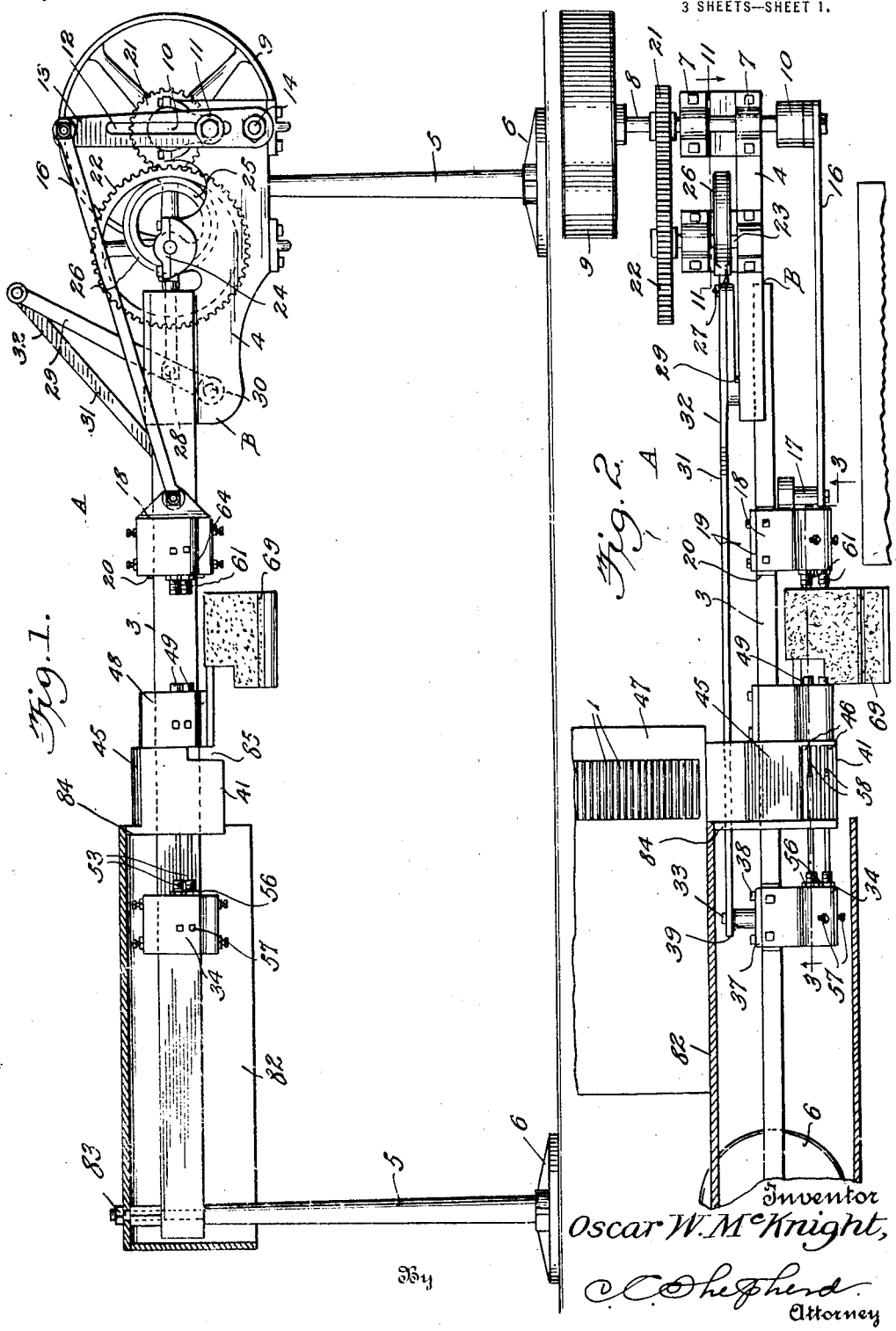

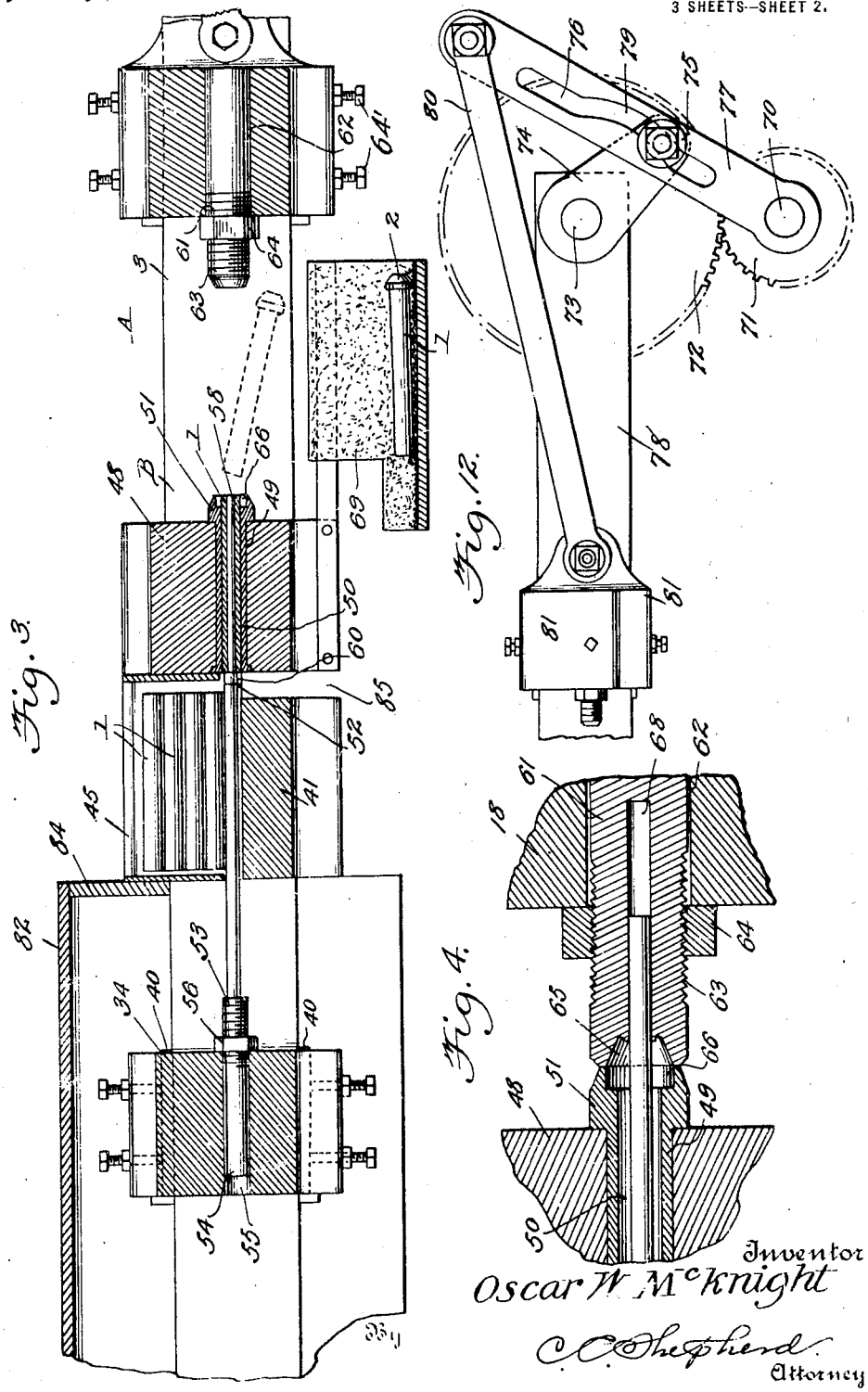

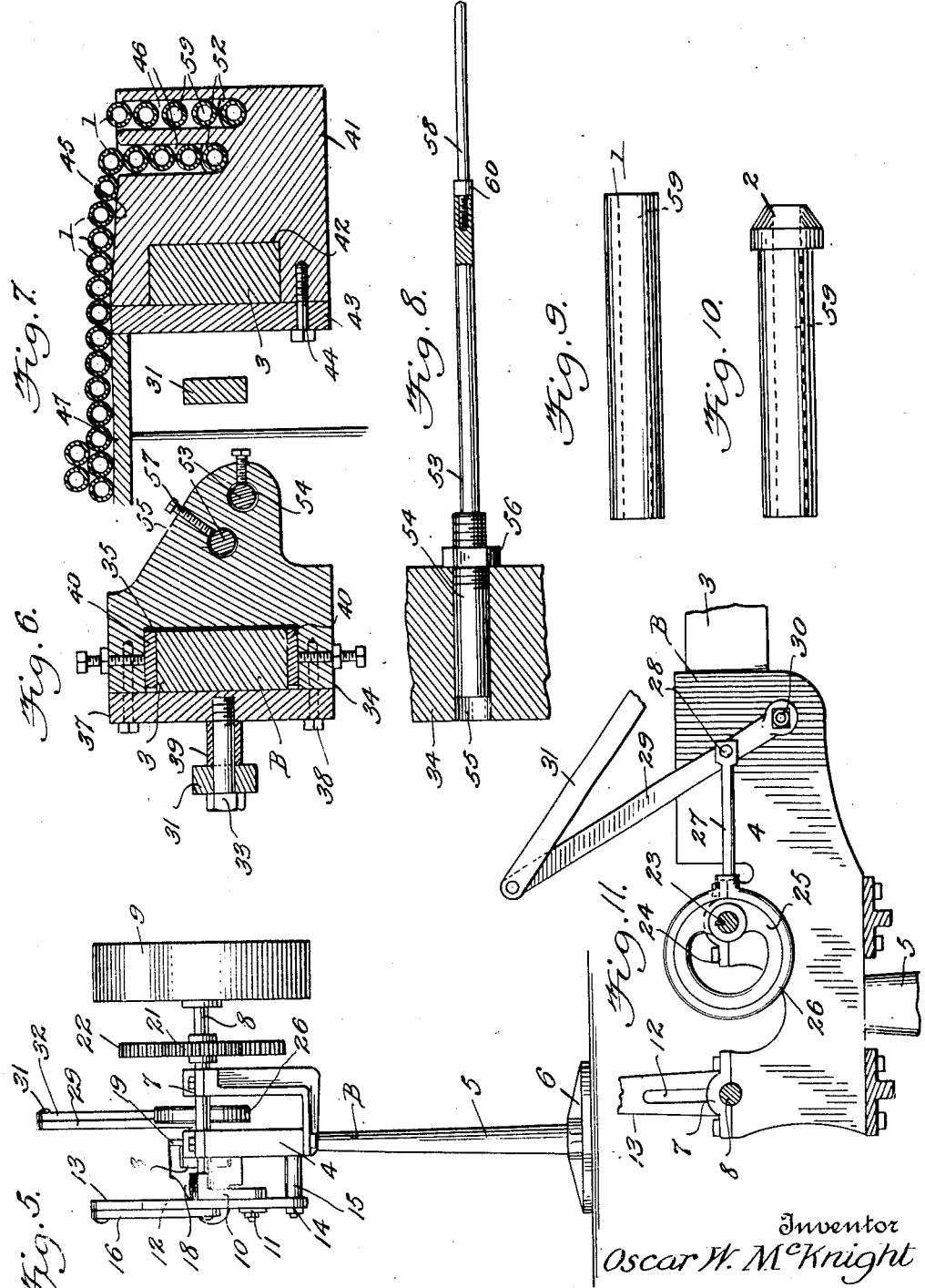

OSCAR W. McKNIGHT, OF COLUMBUS, OHIO, ASSIGNOR TO THE BRUNT TILE AND PORCELAIN COMPANY, OF COLUMBUS, OHIO, A CORPORATION OF OHIO.

BUSHING-FORMING MACHINE.

1,342,053.　　　　Specification of Letters Patent.　　Patented June 1, 1920.

Application filed February 6, 1919. Serial No. 275,295.

*To all whom it may concern:*

Be it known that I, OSCAR W. MCKNIGHT, a citizen of the United States, residing at Columbus, in the county of Franklin and State of Ohio, have invented certain new and useful Improvements in Bushing-Forming Machines, of which the following is a specification.

This invention relates to an improved heading machine for use in conjunction with the manufacture of porcelain or ceramic tubes or bushings; the object of the invention, among others, being to provide a machine of this character capable of increasing the work out-put usually accredited to such machines and at the same time to eliminate the element of manual danger hitherto involved in the operation of said machines.

Another object of the invention resides in a machine of the class stated wherein is provided a traveling die member, a stationary die member, a feed magazine and a moving spindle structure, these elements being correlated so that the stock fed into the stationary die member, from the magazine and by the action of the spindle structure, will be accomplished from the extremity of said stationary die opposite to its forming or impact receiving end, or in other words, that end which coöperates with the traveling die member, this principle of operation being such that it is possible to operate the machine without any degree of physical danger to its operator and, moreover, a completed bushing will be formed which will be entirely straight and free from detrimental blemishes.

A further object of the invention resides in providing a simple and efficient system of actuators for the purpose of effecting the reciprocation of the traveling die member and the spindle structure, said actuators being so proportioned and formed that the head forming operation of the stationary and traveling die members will occur at substantially an idle dwell in the general cycle of movement of the actuators, this feature resulting in the formation of a perfectly shaped head upon a bushing and prevents the latter from kinking or buckling, since if the spindle and die members were to be formed so that the head would be completed while the same were moving toward each other, the presence of a crack or kink in the final formation of the bushing would be inevitable.

A still further object resides in the arrangement of the actuators which permits the spindle to expeditiously eject a form bushing from the stationary die member while the traveling die member is in its normal state of reciprocation but while spaced from engagement with the stationary die, the movement being such that the spindle structure will simultaneously force an unformed tube from the magazine and discharge a completed tube or bushing from the stationary die member without in any way interfering or retarding the normal movement of said traveling die member or without involving any manual operation.

Other objects are to provide the magazine with features of construction which permit the stock rolls or tubes to be fed by gravity into coöperation with the movable spindle structure and die members; to provide a tray for the reception of the formed bushings ejected from the stationary die member; to construct the actuators so that the traveling die member will effect a plurality of complete movements to each complete movement on part of the spindle structure, whereby stock of relatively extended length will be successfully taken care of by the machine without interference on part of the movable die member; to support the semiplastic stock rolls in the stationary die member throughout their length during the process of head formation so as to prevent injury thereto under the pressure and influence exercised by said die members, and to construct the various elements of the machine in an adjustable and readily removable manner whereby various relative adjustments between the parts thereof may be quickly effected as likewise repairs or renewals of injured parts.

The invention accordingly consists in the novel features of construction, combination of elements and arrangement of parts, hereinafter fully set forth in the following description and having the scope thereof indicated in the appended claims.

In the accompanying drawings, forming a part of this specification:

Figure 1 is a side elevation of the bushing forming machine comprising the preferred form of the present invention.

Fig. 2 is a top plan view thereof.

Fig. 3 is a vertical longitudinal sectional view taken substantially along the line 3—3 of Fig. 2.

Fig. 4 is a similar view on an enlarged scale setting forth the construction of the head forming ends of the movable and stationary die members.

Fig. 5 is an end elevation of the actuating end of the machine.

Fig. 6 is a transverse vertical sectional view taken through the spindle holding structure.

Fig. 7 is a similar view setting forth the construction of the feed magazine or hopper.

Fig. 8 is a detailed elevation, partly in section, of the spindle structure.

Fig. 9 is an elevation of a stock roll or bushing before the head is formed thereon by the machine embodying the present invention.

Fig. 10 is a similar view of a completed roll or bushing.

Fig. 11 is a detailed vertical sectional view taken along the line 11—11 of Fig. 2 and setting forth the driving mechanism of the multiplying lever.

Fig. 12 is a detailed modification of a slightly different form of an actuator for the traveling die member.

Similar characters of reference denote like and corresponding parts throughout the several views of the drawings.

At this juncture, it is thought advisable to state that the stock or rolls 1 upon which the machine comprising the present invention operates are initially of a semi-plastic ceramic composition and are therefore capable of being readily molded or shaped to assume desired contours. Before being supplied to the machine, these stock rolls, as they are commonly termed, are of substantially straight cylindrical contour, as shown in Fig. 9, and since they have not been "fired," they are susceptible to shape forming pressures. Therefore, the present invention provides means for operating upon these rolls so that the head or shoulder 2, disclosed in Fig. 10, will be formed thereon, thus forming the final contour of the completed tube or bushing which after ejection from the machine will be in condition to receive the hardening effects of kiln heat. As is well known, these tubes or bushings may be primarily employed in passing electrical wires through walls or other similar structures where insulating features are desirable. Hitherto, it has been the common practice to form the head 2 upon the bushings or stock rolls by manually placing the latter into the shaping position between a vertical movable die and a relatively stationary die. This operation has been attended by several elements of disadvantage, some of which being that a skilled operator was required to insure the proper positioning of the rolls within such machines, the limited production afforded by the latter, and again the extreme likelihood and presence of danger required to be withstood by the operator in inserting the rolls between the die members, as unless the operator was exceptionally careful and constantly attending to the duty at hand, the movable die member would be very likely to catch the hand and cause serious injury.

In order to eliminate this element of manual danger and to provide a machine which will be capable of effecting an increased production over the machines of the prior art, without sacrificing any of the structural advantages in the final form of the finished bushings, the present invention comprises a bushing forming machine A which is so constructed as to be capable of being successfully operated by a relatively inexperienced operator and in a more efficient and safe manner than hitherto obtainable.

To this end, the machine A consists of a frame B, which latter embodies a horizontal and longitudinal extending guide bar 3 and an associated shaft carrying end saddle 4. The parts 3 and 4 being preferably supported by means of depending standards 5, which are provided at their lower extremities with broadened base pieces 6.

Rotatably supported in bearings 7 carried by the end saddle 4 is a drive shaft 8, which carries at one end a pulley wheel 9, by means of which, power may be directly applied to effect the operation of the machine. The opposite end of this shaft 8 is provided with a crank 10, which, in turn, has its free end equipped with a roller or stud 11, the latter operating in an elongated slot 12 formed in a pivoted actuating lever 13, this lever being pivoted as at 14 upon a stud 15 projecting from the side wall of the saddle piece 4. It will thus be seen that the rotation of the shaft 8 will result in imparting an oscillating motion to the actuating lever 13.

Pivotally connected to the upper or free end of the oscillating lever is a link bar 16, which has its other end pivotally connected to a stud 17 projecting from a traveling die holder 18. This holder is formed in its rear face with a slot to receive the guide bar 3, and is retained in position on the latter by means of a rear plate 19, the latter being secured to the holder body by means of suitable screws. In view of the fact that the holder 18 is caused to reciprocate upon the bar 3, the same is equipped with wear plates or gibs 20, which are disposed to engage with the upper and lower edges of said guide bar and are adjustable in their frictional relation with the latter by means of set screws or their equivalents. It will thus be apparent that means have been provided for effecting a sliding movement of the die holder longitudinally of the guide bar 3.

Carried by and rotatable with the drive shaft 8 is a pinion 21, which is disposed to mesh with an enlarged gear 22 the latter being fixed upon an eccentric shaft 23, rotatably mounted in bearings 24 carried by the saddle piece. By use of these gears, it will be seen that the eccentric shaft will rotate at approximately one-half the speed of the lower shaft 8. The purpose for this will be apparent as the description proceeds. Fixed to and rotatable with the shaft 23 is an eccentric 25 shown in detail in Fig. 11 and loosely carried by this eccentric is a wear ring 26 to which the movement of the eccentric is imparted. This ring 26 has suitably connected therewith a rod 27, which has its other end connected for pivotal movement as at 28 with the pivoted multiplying lever 29, the latter, as shown, being pivoted as at 30 upon the saddle piece 4. Owing to the relation between the pivot point of the multiplying lever and its point of connection with the rod 27, it will be seen that a relatively slight movement on part of the eccentric 25 will result in a greatly enlarged movement on part of the free end of the multiplying lever. This feature of construction permits an eccentric of relatively small dimensions to be successfully employed to effect a much greater movement on part of said lever 29.

Connected with the free end of the lever 29 is an angular reach bar 31, the latter being provided with an angular end 32 capable of being connected with the free end of the lever 29 and the greater length of this reach bar is disposed to extend substantially parallel with the guide bar 3. This construction succeeds in placing the reach bar so that it will not interfere with the machine operator's movements. As shown in Fig. 6, the other end of the reach bar is pivotally mounted upon a stud bolt 33 projecting from a spindle holder 34. This holder is similar in design to the die holder 18, and is provided along its rear face with a rectangular opening 35 for the reception of the guide bar 3, and is retained in a sliding position upon said guide bar by means of a back plate 37, the latter being secured to the body of the spindle holder by means of screws 38. The stud bolt 33 is threadedly connected with this back plate 37 and the reach bar is spaced therefrom by means of a tubular bushing 39. Adjustable wear plates 40 are carried by the holder 34 to insure proper positioning thereof upon the guide bar and to take care of excessive wear without losing its operating position. It will thus be seen that the traveling die holder 18 and the spindle holder 34 are mounted for reciprocal movement upon the guide bar 3 and that owing to the manner of driving each holder from separate shafts, the traveling die holder 18 will be caused to reciprocate with substantially double the rapidity as that of the spindle holder 34. In other words, the link movement is such that in this particular machine the spindle holder will complete but one movement to every two complete movements on part of the holder 18. The purpose for this will be presently disclosed.

Situated intermediately of the holders 18 and 34 is a feed hopper or magazine 41. This hopper consists of a rectangular member having its rear face cut away as at 42 to receive the guide bar 3, and is rigidly secured in connection with said guide bar by means of a rear plate 43, which latter is joined to the body of the magazine by means of screws or their equivalents 44. Formed in the magazine and in open communication with the inclined upper wall 45 thereof are a plurality of spaced vertically disposed slots 46, which are so disposed that rolls carried by a table 47, located contiguous to the hopper 41, will be capable of gravitating therein, as is clearly shown in Fig. 7. Also, situated adjacent to the magazine and between the latter and the traveling die holder 18, is a stationary die holder 48, which is permanently carried by the guide bar 3 in substantially the same manner as is the magazine 41. This holder is provided with a plurality of tubular stationary dies 49, which are inserted in horizontal extending openings formed therein, and these stationary dies are provided with enlarged impact and head forming ends 51. The magazine 41, in turn, is also provided with openings 52 in line with the openings 50, and by means of which the stock rolls 1 may be ejected from said magazine and into the stationary dies 49.

To permit of this latter feature, the movable spindle holder 34 is provided with a plurality of longitudinally extending and adjustable spindles 53. The latter, as shown in Fig. 8, are provided with enlarged ends 54 which loosely fit into bores 55 formed in the spindle holder 34. These ends 54 are also threaded to receive adjusting nuts 56, which bear against the side wall of said spindle holder and are retained in this position by the use of set screws 57, the latter being formed so that they will enter threaded openings formed in the holder 34 and press upon the enlarged ends 54 of the spindles. It will thus be manifest that by loosening the set screws and by adjusting the nuts 56, longitudinal adjustments on part of the spindles 53, as a whole, may be quickly afforded. The free ends of the spindles are provided with removable end members 58 which are of a diameter to enter the longitudinal bores 59 of the stock rolls throughout their approximate length and, as shown, these end members are also provided at their points of connection with the spindle body with enlarged collars 60 which are of substantially the same proportion as the outside diameter of the stock rolls 1. Thus in operation, the advance movement on part of the spindle holder 34 will cause the end members 58 of the spindles 53 to enter the slots 46 of the magazine 41 so that the same will engage with the bores 59 of the stock rolls 1 positioned therein. Continued forward movement on part of the spindle holder causes the collars 60 to contact with the ends of the stock rolls so that still further movement of the spindle holder will cause the stock rolls to be ejected from the slots 46 and into the stationary dies 49, as is clearly shown in Fig. 3. It will be noted that during this movement on part of the stock rolls, the same will be supported throughout their length by the internally situated end members 58 of the spindles 53, so that the element of fracture hitherto found in machines of the prior art will be eliminated in the tubes or bushings operated upon by the machine forming the subject matter of this invention.

After a bushing or roll has been inserted into the stationary die holder, the same will be operated upon by means of a pair of traveling dies 61 which are carried by the holder 18. These dies are formed to loosely fit within bores 62 formed in the holder 18 and are provided with threaded ends 63 for the reception of adjusting nuts 64, and are retained in position through the instrumentality of set screws 64'. This construction, as will be observed, is substantially the same as that employed in mounting the spindles 53 within their holder 34, and it will be noticed that by loosening the set screws 64 and by adjusting the nuts 63, longitudinal adjustment on part of said dies 61 may be readily afforded. This adjustment is afforded to insure accurate engagement between the stationary dies 49 and said traveling dies 61.

The other ends of the dies 61 are provided with annular cup shaped depressions 65, which are adapted to coöperate with similar depressions 66 formed in the stationary die, and these cup shaped depressions are employed when the dies are in contiguous relation to form the enlarged head or shoulder 2 upon one end of the stock rolls 1. It will be seen that when the traveling dies 61 contact or register with the stationary dies, the protruding end portions of the stock rolls situated within the stationary dies will be mashed into these cup shaped depressions so that when the dies are again separated, the desired shoulder or head 2 will be formed. To prevent the bores of the stock rolls from filling up with material, the spindle ends 58 enter coöperating bores 68 formed in the traveling die 61, and this feature insures full thrusting action on part of the spindles so that sufficient material will be presented to the forming dies to complete the shoulders 2, also, the bores 68 receive said spindle ends to prevent their interference with the movement of said traveling dies. Upon the next subsequent operation of the spindles 53, the formed bushings in the stationary dies 49 will be ejected by the pressure exerted thereon caused by an unformed roll entering the said stationary dies by the movement of the spindles, and this ejection of formed bushings will take place immediately prior to forming coöperation between the traveling and stationary dies. A felt covered tray 69 is carried by the stationary die holder 48 and is so positioned that the ejected bushings will fall therein and whereby they may be conveniently collected by the machine operator and placed in their proper positions upon a table to be subjected to the hardening effects of kiln heat.

In the form of the invention described it will be noted that the traveling die will complete two operations to every single operation on part of the spindle members. In other words, the traveling die will contact twice with each bushing carried by the stationary dies. This insures a completely finished product which will be free from all extraneous or superfluous matter, and moreover, a machine constructed along this line will be capable of handling bushings of considerable length, as the problem of discharge can be readily taken care of, since if the traveling die were to complete a bushing on each operation, difficulty would ensue in taking care of the ejection of the finished bushings before the return of the traveling dies. This problem is not so difficult where relatively short bushings are being manufactured but in bushings of extended length, it has been found advisable to simply eject a completed bushing on every other operation of the traveling die, as the latter may then be spaced a considerable distance from the stationary die when the discharge of completed bushings from the stationary die is being effected. In the form of the invention illustrated, it will be manifest that the shoulder forming operation on part of the traveling dies will take place when the levers 13 and 29 are at substantially a dead center, or to be more accurate, when the spindles 53 are just beginning to return. This feature prevents the bushings confined between the spindles and the moving dies from becoming unduly crushed or kinked around points intimate to their heads or shoulders 2. In other words, limited freedom of movement is given the rolls when their heads are being formed so that buckling or bending thereof will be eliminated.

This construction has the advantage of completing a bushing without any blemishes or bends in its final contour and solves a problem which has been eminent in the majority of the machines of the prior art.

In the manufacture of relatively small bushings, particuarly those below five inches in length, it is possible to form a completed bushing on each operation of the traveling die members, and a structure for accomplishing this result has been diagrammatically illustrated in Fig. 12 of the drawings. In this latter construction, the drive shaft 70 is provided with a pinion 71, which meshes with an enlarged gear 72 rotatable with a frame journal shaft 73, the use of these timing gears serving to reduce the relative speeds between the power and driven shafts 70 and 73 respectively and permits of the use of a relatively high speed motor or fly wheel. Rotatable with the shaft 73 is a crank arm 74 which carries at its free end a stud or roller 75, the latter operating in the slot 76 formed in a pivoted oscillating lever 77, the latter in this instance being loose upon the shaft 70, or may be pivoted to the machine frame 78. It will be noted that this slot 76 is formed with an arcuate shaped portion 79 which is struck from a radius defined by the axis of the shaft 73. Thus when the lever is in the position shown in Fig. 12, its movement will be substantially arrested during the travel of the pin or roller 75 therethrough. However, when said roller contacts with the lower straightened portion of the slot 76, an extremely rapid movement on part of the lever 77 is effected, as will be clearly understood. This dwell or rest in the movement of the oscillating lever 77 permits the eccentric operating the movable spindle structure to advance forwardly so that a new bushing will be carried by the stationary die holder upon each successive operation of the traveling die. As shown, a link 80 connects the oscillating lever 77 with the traveling die holder 81 substantially in the manner disclosed in the preferred form of the invention.

From the foregoing it will be seen that there is provided a machine of considerable utility and one wherein manifold advantages of safety, construction and operation, are among others, present. It is immaterial as to the number of dies employed. In the preferred form coöperating pairs have been shown, but it is obvious that this number may be decreased or increased in accordance with the production capacity desired, and that such a change is simply a mere matter of design and of no material inventive importance. This alternate construction has been shown in Fig. 12 wherein the die holder 81 is provided with but a single die. It will be further appreciated that the machine need not necessarily be formed so that the traveling dies will complete a plurality of operations to every single operation on part of the spindles, but as shown in Fig. 12, means have been provided whereby a completed bushing may be formed upon each complete movement of the traveling dies. However, it has been found advisable to employ a plurality of movements wherein bushings of extended length are being formed. The operator of the machine is simply required to feed the tubes or rolls 1 into the magazine slots, and to see that each slot is filled to its capacity and to remove the completed bushings from the felt covered receiving tray 69. A casing 82 is placed over the movable spindle holder and spindles, and is clamped in its position by means of nuts 83 carried by one of the end standards 5, the forward end of this casing in this instance resting upon an up-standing wall 84 of the magazine. This casing fully protects the machine operator from any possible injury, and in view of the fact that the operator is not located near the other end of the machine, it is not necessary to incase the holder actuators, although this feature may be provided for if found expedient. In the event of the plastic rolls wedging in the hopper, these wedged rolls may be removed by providing the magazine with a vertical cut-away portion 85 which coöperates with the magazine's slots. By simply inserting a tool into these slots, the wedged rolls may be readily extricated from their work obstructing positions.

I claim:

1. A machine of the class described, the combination with a supporting frame, of a tubular die stationarily supported in connection with said frame, a reciprocatory die located in horizontal alinement with said stationary die, drive means coöperative with said reciprocatory die to effect its movement into and out of head forming relation with said stationary die, and mechanism coöperative with said drive means for inserting stock into said stationary die at the end of the latter opposite to its head forming or impact receiving end.

2. A machine of the class described, the combination with a supporting frame, of a magazine carried by said frame and having a discharge opening extending longitudinally therethrough, a tubular die located in stationary registration with said discharge opening, a spindle member slidably supported by said frame and operating to transmit an unformed stock roll from said magazine and into said die, a traveling die oppositely located with respect to said spindle member and magazine and supported by said frame for head forming coöperation with said stationary die, drive means for effecting the reciprocation of said spindle member, and coöperative means for effecting a plurality of complete movements on part of the traveling die to each complete movement of the spindle member.

3. A machine of the class described, the combination with a stationary tubular die, a reciprocatory die located for head forming coöperation with respect to said stationary die, spindle means operating to place an unformed roll into said stationary die and to simultaneously eject a formed roll therefrom, and drive means for effecting synchronized movement on part of said spindle means and traveling die so that the said spindle means and traveling die will be substantially idle during the head forming process.

4. A heading machine for ceramic tubing, comprising a supporting frame, a stationary tubular die supported in connection with said frame, a magazine, a spindle structure operable to engage and eject a stock tube from said magazine and into said die, and a traveling die capable of registering with said stationary die to form a head upon said tube at the end of said stationary die opposite to its tube receiving extremity.

5. A heading machine for ceramic tubings, comprising a supporting frame, a stationary tubular die supported by said frame, a magazine for feeding tubular stock rolls into approximate alinement with said die, a sliding spindle structure capable of ejecting said rolls from said magazine and into said die, a relatively reduced end formed upon said spindle structure and positioned to enter the bore of a roll located in said magazine so that the latter will be longitudinally supported during its transit from the magazine to its position in the stationary die, and a traveling die operating in conjunction with a stationary die to form heads upon said rolls at the forward ends of the latter.

6. In a bushing forming machine having, in combination, a supporting structure, a feed hopper supported in connection with said structure and having a roll discharging opening formed therein, a stationary die supported in horizontal alinement with the opening of said hopper, a reciprocatory die carried by said structure and situated in substantial alinement with said stationary die members, of a magazine coöperative with said structure and located on the opposite side of said hopper with relation to said stationary die, and a spindle carried by said member and operable upon the advance of the latter to enter, support and eject the rolls into and from said stationary die.

7. In a bushing forming machine, the combination with stationary and traveling die members, of a magazine coöperative with said stationary die to support a roll or bushing in horizontal alinement therewith, a reciprocatory spindle capable of entering said rolls while the latter are positioned in said magazine and to eject the same into said stationary die whereby a formed bushing positioned in the stationary die will be ejected from the latter by the advancing unformed roll, and means for effecting the reciprocation of said traveling die and spindle.

8. In a bushing forming machine having, in combination, a supporting structure, a stationary die holder mounted upon said structure, a reciprocatory die head slidably connected with said structure, substantially tubular forming dies carried by said holder and head and located in horizontal alinement with respect to each other, a magazine situated adjacent to said holder, and a traveling spindle carrying member capable of ejecting stock rolls from said magazine and into head forming relation with said dies at the end opposite to the impact receiving end of the holder die.

9. In a bushing forming machine having, in combination, a supporting structure, a stationary die holder mounted upon said structure, a reciprocatory die head slidably connected with said structure, substantially tubular forming dies carried by said holder and head and located in horizontal alinement with respect to each other, a magazine situated adjacent to said holder, a traveling spindle carrying member capable of ejecting stock rolls from said magazine and into head forming relation with said dies at the end opposite to the impact receiving end of the holder die, and means for effecting a plurality of complete operations on part of said die head to every single operation on part of said spindle carrying member.

10. In a bushing forming machine, the combination with a supporting frame, of a tubular die stationarily supported in connection with said frame, a reciprocatory die located substantially in horizontal alinement with said stationary die, and means operating to eject a formed bushing from said stationary die and to insert an unformed bushing therein during the idle movement of said reciprocatory die.

11. In a bushing forming machine, the combination with a supporting frame, of a tubular die stationarily supported in connection with said frame, a reciprocatory die located substantially in horizontal alinement with said stationary die, means operating to eject a formed bushing from said stationary die and to insert an unformed bushing therein during the idle movement of said reciprocatory die, and a tray structure coöperative with said dies to receive the ejected or formed bushings.

In testimony whereof I affix my signature.

OSCAR W. McKNIGHT.